(12) United States Patent
Wood

(10) Patent No.: US 7,638,006 B2
(45) Date of Patent: Dec. 29, 2009

(54) METHOD OF GENERATING FLUORINE GAS USING CORUSCATIVE REACTION

(75) Inventor: James R. Wood, Grapevine, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 553 days.

(21) Appl. No.: 10/922,866

(22) Filed: Aug. 23, 2004

(65) Prior Publication Data

US 2006/0038160 A1    Feb. 23, 2006

(51) Int. Cl.
| | |
|---|---|
| C06B 33/00 | (2006.01) |
| C06B 45/00 | (2006.01) |
| D03D 23/00 | (2006.01) |
| D03D 43/00 | (2006.01) |

(52) U.S. Cl. ............ 149/37; 149/2; 149/108.2; 149/108.4; 149/109.4

(58) Field of Classification Search ............ 149/37, 149/109.4, 108.2, 108.4, 2
See application file for complete search history.

(56) References Cited

U.S. PATENT DOCUMENTS

| | | | |
|---|---|---|---|
| 1,135,205 A | | 4/1915 | Phillipson |
| 3,135,205 A | | 6/1964 | Zwicky |
| 3,654,867 A | | 4/1972 | Murray |
| 3,675,575 A | * | 7/1972 | Bailey et al. ............... 102/306 |
| 3,707,195 A | | 12/1972 | Lanmon, II |
| 5,253,584 A | | 10/1993 | Allford |
| 5,454,363 A | | 10/1995 | Sata |
| 6,569,802 B1 | * | 5/2003 | Ionkin ........................ 502/224 |
| 6,703,578 B2 | | 3/2004 | Walker et al. |
| 6,955,801 B2 | * | 10/2005 | Torisu et al. ................ 423/500 |
| 2004/0256038 A1 | * | 12/2004 | Wood et al. ................ 149/19.3 |
| 2005/0230018 A1 | | 10/2005 | Viecelli et al. |
| 2007/0056462 A1 | | 3/2007 | Bates et al. |

FOREIGN PATENT DOCUMENTS

| | | |
|---|---|---|
| DE | 41 36 272 A1 | 5/1993 |
| WO | 90/10611 | 9/1990 |
| WO | 90/10724 | 9/1990 |
| WO | 94/24074 | 10/1994 |

\* cited by examiner

*Primary Examiner*—Jerry Lorengo
*Assistant Examiner*—James E McDonough
(74) *Attorney, Agent, or Firm*—Buchanan Ingersoll & Rooney PC

(57) ABSTRACT

A fluorine gas generating material composition comprises a fluorine bearing material, the fluorine bearing material releasing fluorine gas at a first temperature, and a coruscative material, a reaction temperature of the coruscative material equal to or greater than the first temperature. In some embodiments, the fluorine bearing material is a nickel-based alloy and the coruscative material includes an element from Group IVB, VB or VIB of the periodic table or a transition metal and a carbon-based material. The fluorine gas generating material composition can be incorporated into a product such as a munition, a flare, a shape charge or an impulse device. The disclosed fluorine gas generating material composition can be used to produce work in applications and methods that include point delivery of fluorine gas, explosives related applications, aerospace applications, and applications in the fields of mining and drilling.

9 Claims, 4 Drawing Sheets

METHOD OF GENERATING FLUORINE GAS USING CORUSCATIVE REACTION

FIELD OF THE DISCLOSURE

The present disclosure generally relates to storing and releasing fluorine gas. More specifically, the present disclosure relates to releasing fluorine from a fluorine bearing material using a coruscative reaction and delivering the fluorine gas to a delivery point and/or applying the released fluorine gas to accomplish a desired task.

STATE OF THE ART

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Fluorine gas and its derivatives are currently used in several applications. For example, mining and drilling operations, such as oil and natural gas exploration and recovery, use HF gases and acids pumped into the mine/well to reduce the size of blockages and remove blockages impeding both continued drilling and continued recovery of product. In another example, to achieve the desired thrust, kinetic energy weapons have multistage motors that add complexity, length and mass to the weapon. In a further example, fluorine gas transported in a high pressure or a cooled and/or liquefied state can react dangerously if mishandled and is costly to transport, requiring special handling procedures and precautions. Other examples can be found in the aerospace field and the chemical, biological and petroleum fields where fluorine gas and its derivatives are or can be utilized.

Some coruscative materials, mining and drilling equipment and procedures, and pyrotechnics relevant to this disclosure are disclosed in U.S. Pat. Nos. 1,135,205; 3,654,867; 3,675,575; 3,707,195; 5,253,584; 5,454,363; and 6,703,578. The disclosure of each of these patents is herein incorporated by reference. Additional relevant disclosure is contained in WO 90/10611; WO 90/10724; WO 94/24074; and DE 41 36 272.

SUMMARY

An exemplary embodiment of a fluorine gas generating material composition comprises a fluorine bearing material, the fluorine bearing material releasing fluorine gas at a first temperature, and a coruscative material, a reaction temperature of the coruscative material equal to or greater than the first temperature.

Another exemplary embodiment of a fluorine gas generating material composition comprises a fluorine bearing material, the fluorine bearing material including a nickel-based alloy that stores fluorine at room temperature and releases fluorine gas at a first temperature at least about 350° C., a coruscative material including an element from Group IVB, VB or VIB of the periodic table and a carbon-based material, a reaction temperature of the coruscative material equal to or greater than the first temperature, and a separator, wherein the coruscative material, the fluorine bearing material and the separator are arranged as a multilayer having a first layer of the fluorine bearing material, a second layer of the coruscative material, and the separator on at least one side of the coruscative layer.

An exemplary embodiment of a product for producing fluorine gas comprises a fluorine bearing material, the fluorine bearing material releasing fluorine gas at a first temperature, a coruscative material, a reaction temperature of the coruscative material equal to or greater than the first temperature, and a container containing the fluorine bearing material and the coruscative material, the container having an opening to vent released fluorine gas, wherein the coruscative material is positioned within the container at least partially adjacent to the fluorine bearing material.

An exemplary embodiment of a method of delivering a fluorine gas to a delivery point comprises storing fluorine gas in a product for producing fluorine gas and transporting the product for producing fluorine gas from a storing location to the delivery point. The product includes a fluorine bearing material releasing the stored fluorine gas at a first temperature, a coruscative material having a reaction temperature of the coruscative material equal to or greater than the first temperature and a container containing the fluorine bearing material and the coruscative material, the container having an opening to vent released fluorine gas, wherein the coruscative material is positioned within the container at least partially adjacent to the fluorine bearing material.

An exemplary embodiment of a method of clearing debris from a downhole comprises placing a charge in a region of the downhole, the charge including a fluorine gas generating material composition having a fluorine bearing material and a coruscative material, releasing fluorine gas by initiating a reaction of the coruscative material to heat the fluorine bearing material, and clearing the debris by expansion or flow of the released fluorine.

An exemplary embodiment of a method of providing impulse to an object comprises incorporating a fluorine gas generating material composition into the object, the fluorine gas generating material composition including a fluorine bearing material releasing fluorine gas at a first temperature, and a coruscative material having a reaction temperature equal to or greater than the first temperature; and impulsing the object by initiating a reaction of the coruscative material of the fluorine gas generating material composition to release fluorine gas.

An exemplary embodiment of a method of perforating armor comprises incorporating a fluorine gas generating material composition into a kinetic energy penetrator, the fluorine gas generating material composition, including a fluorine bearing material, the fluorine bearing material releasing fluorine gas at a first temperature and a coruscative material, a reaction temperature of the coruscative material equal to or greater than the first temperature, initiating a reaction of the coruscative material of the fluorine gas generating material composition to release fluorine gas to a propellant fuel, and reacting the fluorine gas and the propellant fuel to increase a velocity of the kinetic energy penetrator toward the armor.

A method to perforate or erode armor, the method comprises directing a penetrator toward the armor, the penetrator comprising a fluorine gas generating material composition including a fluorine bearing material releasing fluorine gas at a first temperature and a coruscative material having a reaction temperature equal to or greater than the first temperature, and at least one vent from a volume containing the fluorine gas generating material composition to vent released fluorine gas to atmosphere, initiating a reaction of the coruscative material of the fluorine gas generating material composition to release fluorine gas, and directing the released fluorine gas toward the armor to perforate or erode the armor An exemplary embodiment of a method to perforate an object comprises positioning a product for producing fluorine gas in a vicinity of the object, detonating a high explosive material to fracture the container into a plurality of particles, initiating a reaction of the coruscative material to generate heat and a solid reaction product, releasing stored fluorine gas from the fluorine bearing material, and expanding or flowing the released fluorine gas to drive the plurality of particles toward the object. The product includes a fluorine bearing material, the fluorine bearing material releasing the stored fluorine gas at a first temperature, a coruscative material, a reaction temperature of the coruscative material equal to or greater than the first temperature, and a container containing the fluorine bearing material and the coruscative material, wherein the coruscative material is positioned within the container at least partially adjacent to the fluorine bearing material.

BRIEF DESCRIPTION OF THE DRAWING FIGURES

The following detailed description of preferred embodiments can be read in connection with the accompanying drawings in which like numerals designate like elements and in which:

FIGS. 1A to 1C schematically illustrate several exemplary embodiments of a fluorine gas generating material composition.

Figure 3A:
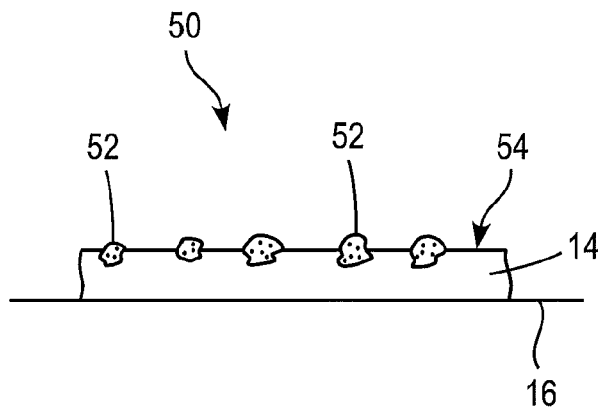
FIG. 3A illustrates an exemplary fluorine gas generating material composition with a layer of coruscative material and embedded particles of a fluorine bearing material.
Figure 3B:
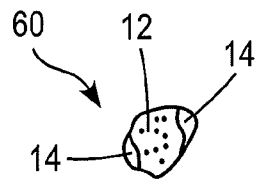

FIG. 3B fluorine gas generating material composition illustrates an exemplary fluorine gas generating material composition in the form of particles, each particle comprising coruscative material and fluorine bearing material.

Figure 4:
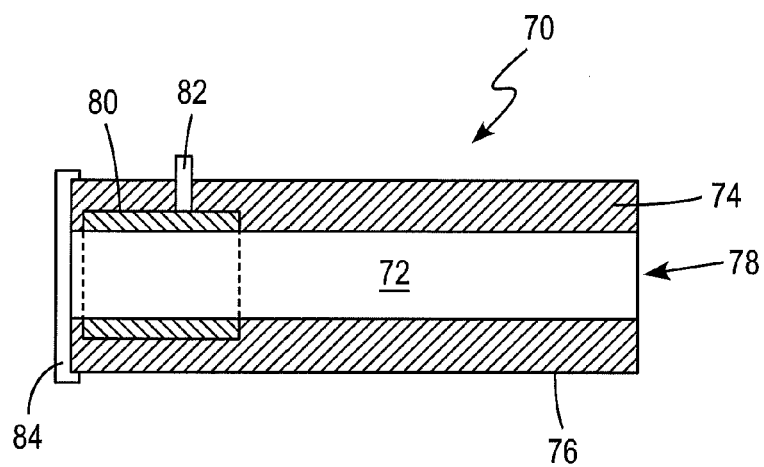

FIG. 4 is a cross-sectional view of an exemplary product for producing fluorine gas.

Figure 5:
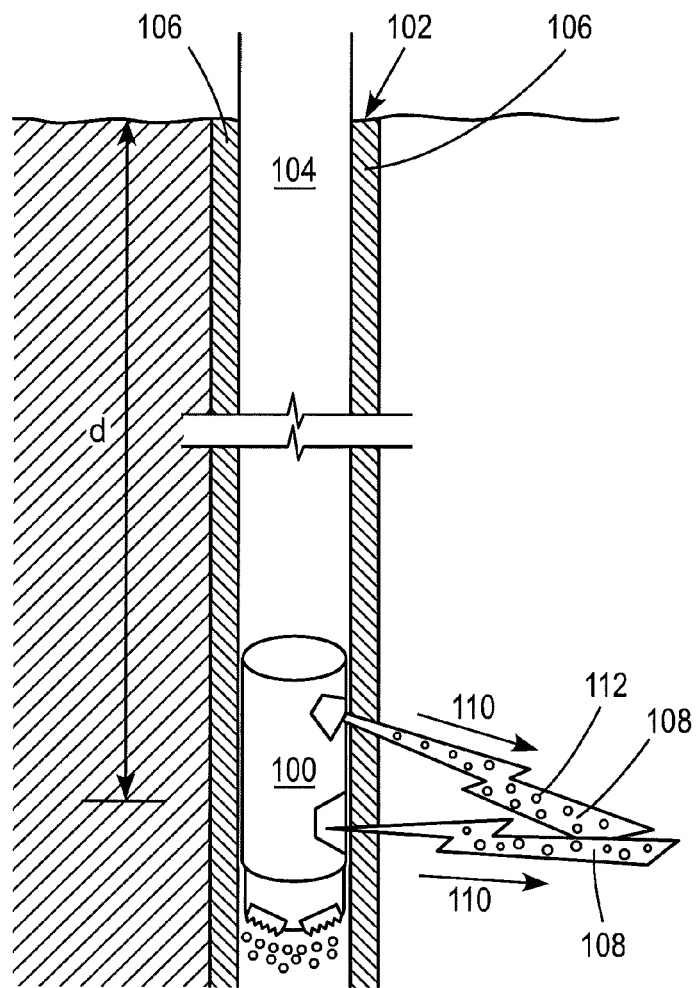

FIG. 5 shows a simplified view of a charge including a fluorine gas generating material composition having a fluorine bearing material and a coruscative material placed within a downhole of a well.

Figure 6:
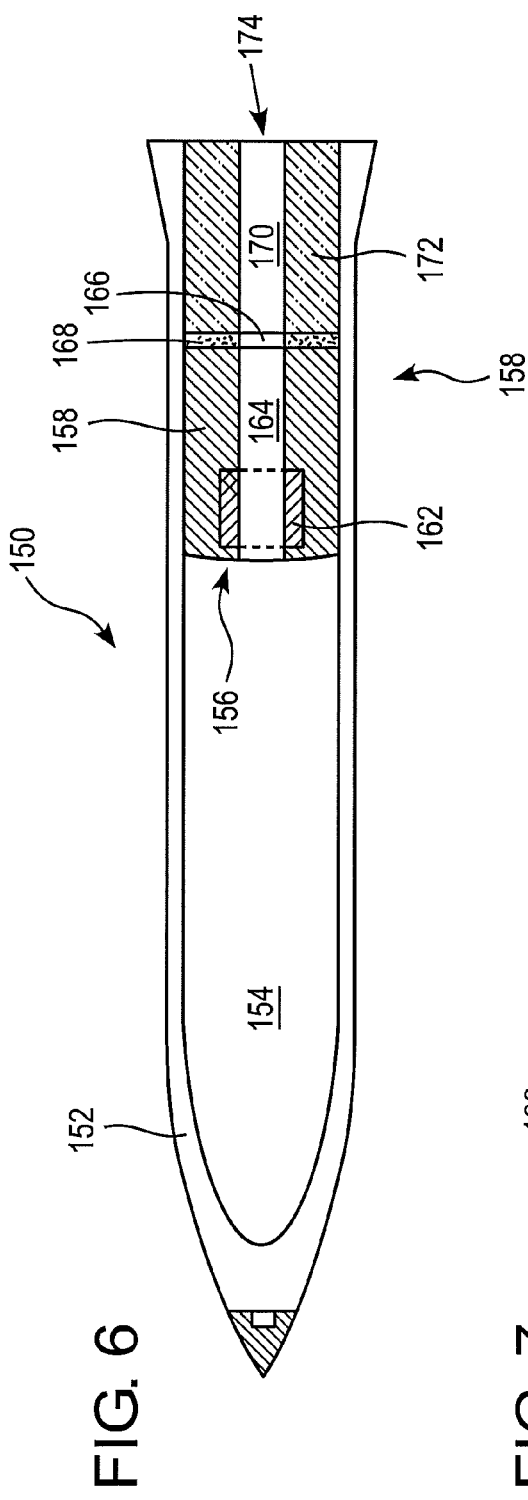

FIG. 6 shows an exemplary embodiment of an object that incorporates a method of providing impulse with fluorine gas released from a fluorine gas generating material composition directed to a combustion region where it combines with a fuel, the reaction products then provide an impulse to the object.

Figure 7:
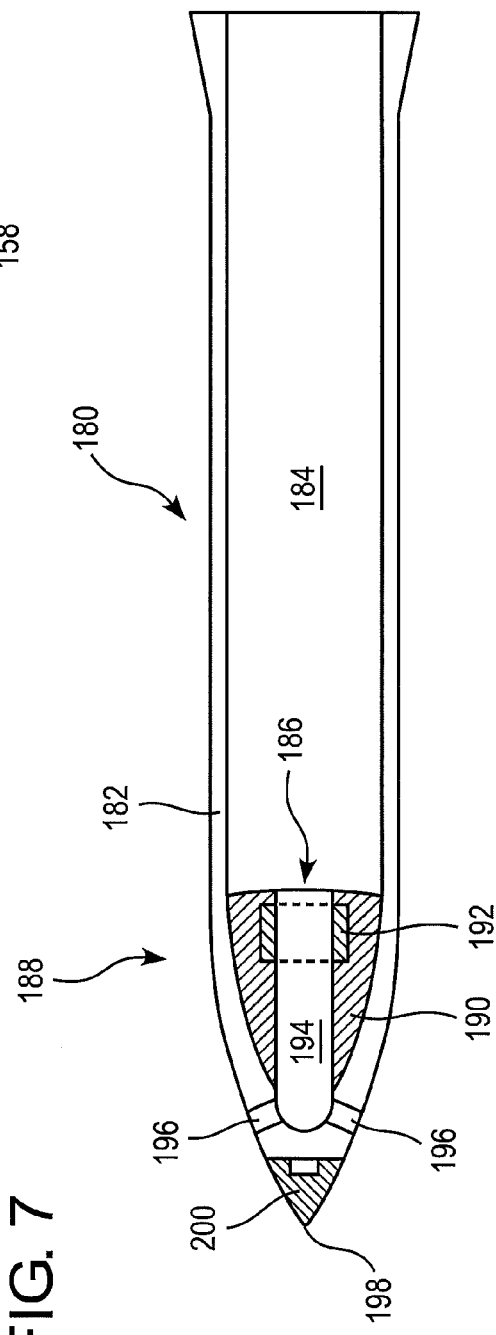

FIG. 7 shows an exemplary embodiment of a penetrator that incorporates a fluorine gas generating material composition and vents the fluorine gas to perforate, erode or abrade armor.

DETAILED DESCRIPTION

Coruscative materials include metal and carbon-based mixtures and/or alloys of metal and carbon-based materials that undergo a non-outgassing reaction at elevated temperatures of at least about 2500° C. (±10%), preferably at least about 3000° C. (±10%), and more preferably about 4000° C. (±10%). Generally, the reaction is non-outgassing and produces either a solid or a liquid reaction product.

The actual rate of reaction, the elevated temperature produced by the reaction, and the energy released varies depending on the metal and carbon-based materials in the composition. The rate of reaction is primarily a function of the size and packing density of the coruscative materials, e.g., the metal and the carbon-based material, and secondarily a function of the stoichiometry of the reagents selected as the coruscative material. For example, smaller particles can be packed more closely together and at a higher density. Thus, when the reaction starts, the smaller particles have a faster rate of transfer between adjacent particles of the initiating conditions for the coruscative reaction, whether the initiating condition is temperature, pressure or another parameter, than do larger particles with less packing density, e.g., more void space between particles or reagents. In one example, sputtered or co-sputtered coruscative material demonstrated reaction rates at least 100×. The temperature of the reaction is a function of the stoichiometry of the reagents selected as the coruscative material. The energy density is also a function of the stoichiometry of the reagents selected as the coruscative material. In one example, a coruscative composition of a mixture of titanium (Ti) powder and carbon (C) powder combine to form TiC and release 6.6 kilo-cal per cc of reactants (e.g., energy density of 6.6 kilo-cal per cc). For comparison, TNT has an energy density of about 1.3 kilo-cal per cc).

Table 1 lists coruscative materials and parameters associated with coruscative materials. Materials that undergo a pyrothechnic and/or a thermitic reaction are also included. In some of the embodiments disclosed herein, materials that undergo a pyrothechnic and/or a thermitic reaction may be substituted for the coruscative materials or may be used in combination with the coruscative material.

TABLE 1

| Composition Reagents | Reaction Type | Reaction | Fabrication Method | Comments |
|---|---|---|---|---|
| Fe, Al | C | $Fe_3O_2 + Al$<br>$Fe + Fe_3O_2 + Al$ | Coated Al cone<br>Cavity packed with iron and/or ferritic oxide plus Al | ≈3.6-4.0 kcal/cc, liquid products |
| Ti, C | C | $Ti + C$ | Cu cone vapor deposited with alternating layers of Ti and C<br>Compacted Ti and C slug in cavity | ≈6.6 kcal/cc, solid products |
| Al, K | C | $Al + KClO_3$<br>$Al + KClO_4$ | Al cone coated with $KClO_3$ or $KClO_4$<br>Compacted Al and $KClO_3$ or $KClO_4$ slug in cavity | |

TABLE 1-continued

| Composition Reagents | Reaction Type | Reaction | Fabrication Method | Comments |
|---|---|---|---|---|
| Ca, Si | C | $CaSO_4 + SiO_2$ | Glass cone coated with $CaSO_4$ Compacted $CaSO_4$ and $SiO_2$ slug in cavity | |
| Al, O | C | | | |
| Ti, B, C | C | $Ti + 0.305 B_4C = 061 TiB_2 + 0.39 TiC_{0.78}$ | | |
| Al, $Na_2O_2$ | C | $2Al + 3 Na_2O_2$ | | |
| PbO, Al | C | $3PbO_2 + 4 Al$ | | |
| Zr, B, C | C | $Zr + BC$ | | |
| Hf, B, C | C | $Hf + BC$ | | |
| V, B, C | C | $V + BC$ | | |
| Al, Na | P | $Al + NaClO_3$ $Al + NaClO_3$ | Al cone with slug insert | $NaClO_3$ and $NaClO_3$ are hygroscopic |
| Al | P | Al powder or slug insert | Cu liner packed with metal powder or with slug insert | Optional addition of oxidizer |
| Ti | P | Ti powder or slug insert | Cu liner packed with metal powder or with slug insert | Optional addition of oxidizer |
| Zn | P | Zn powder or slug insert | Cu liner packed with metal powder or with slug insert | Optional addition of oxidizer |
| Fe | P | $Fe_2O_3$ powder or slug insert | Cu liner packed with metal powder or with slug insert | Optional addition of oxidizer |
| Cu | P | Cu filling + copper benzoate | Cu liner packed with metal powder or with slug insert | |
| Metal Foil | T | | Bond reactive foil to cone of shape charge or into cavity | |
| PERFORM ™ charge | | | | Available from Baker Atlas |

Reaction Type Key: C = Coruscative; P = Pyrotechnic; T = Thermitic

An exemplary embodiment of a fluorine gas generating material composition comprises a fluorine bearing material, the fluorine bearing material releasing fluorine gas at a first temperature, and a coruscative material, a reaction temperature of the coruscative material equal to or greater than the first temperature.

In exemplary embodiments, the fluorine gas generating material composition is a mixture of powders, or layers of powders or solid layers, and/or are formed into shapes, such as plates, sheets, wires, ribbons, tapes, threads, cylinders and so forth by, e.g., press forming, and/or are multilayers. Segregated mixtures can also be used where the fluorine bearing material is in a first region and the coruscative material is in a second region.

In some embodiments, the rate of release of fluorine gas from the fluorine bearing material can be controlled by controlling, e.g., increasing or decreasing, the rate of thermal transfer of heat from the coruscative material to the fluorine bearing material. Examples of techniques and structures that can control the rate of thermal transfer includes varying the packing density of materials forming the coruscative material, varying the packing density of the coruscative material with the fluorine bearing material, using separators to separate coruscative material from fluorine bearing material, and varying composition, size, thickness and position of coruscative material and fluorine bearing material within a segregated mixture. One method to achieve maximum retardation of thermal transfer can be achieved by separating the coruscative material from the fluorine bearing material by a substrate. Suitable substrates include polymers, metals (e.g., foils), and metallized materials, such as metallized cellulose-based materials and metallized polymers.

In preferred embodiments, the coruscative material is a mixture of a metal and a carbon-based material. Preferably, the mixture is a pressed body, e.g., a green body, of powders or particles of individual reagents of the coruscative material or particles of coruscative material. Optionally, the pressed body includes a binder and is sintered to improve cohesiveness of the mixture. An example of reagents used in the coruscative include a metal element from Group IVB, VB or VIB of the periodic table, preferably titanium, or a transition metal, preferably iron, and a carbon-based material, preferably carbon. Other reagents are included in Table 1.

In preferred embodiments, the fluorine bearing material is a ceramic or a metal that stores fluorine. In other words, the fluorine bearing material in a solid form absorbs fluorine gas into the matrix of the solid. The term solid refers to the solid state and can include a particle, a powder, or a heat such as a bar, sheet or tube or can include an agglomerated or pressed and shaped particle, powder, or heat. At room temperature, the fluorine bearing material is stable in that the absorbed fluorine gas is not desorbed or otherwise substantially released (10% change in volume) and the fluorine gas in the fluorine bearing material is not reactive. At elevated temperatures, e.g., temperatures of at least about 350C. (10%), preferably temperatures of at least 400C. (10%), the fluorine bearing material releases the stored fluorine. This release may be at low velocity, e.g., less than or equal to about Mach 1, or may be at high velocity, e.g., from about Mach 1 to about Mach 5, depending on the reaction rate and the elevated temperature. Fluorine bearing materials are also known as "sponges" for the ability to take up and release fluorine. An example of a fluorine bearing material includes potassium hexafluoronickelate(IV) Commercially available nickel-based alloys include HALO SAFE™ available from Lambda Physik and solid state fluorine generator alloys available from Showa Denko.

Figure 1A:
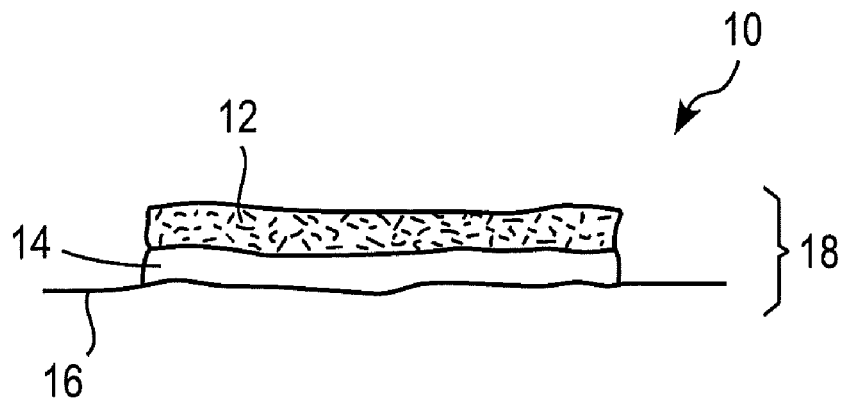
Figure 1B:
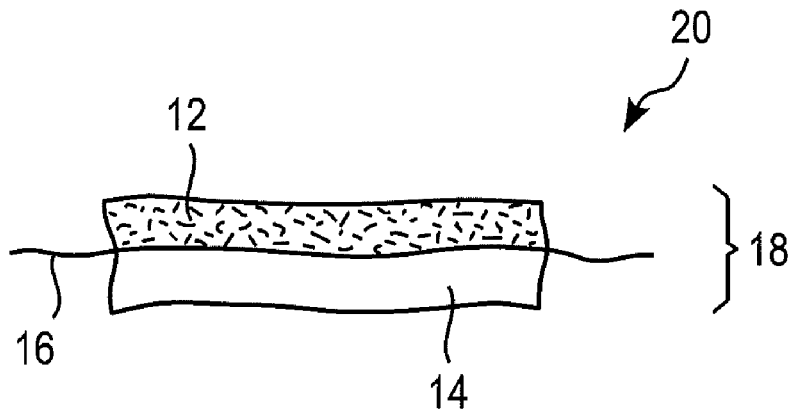
Figure 1C:
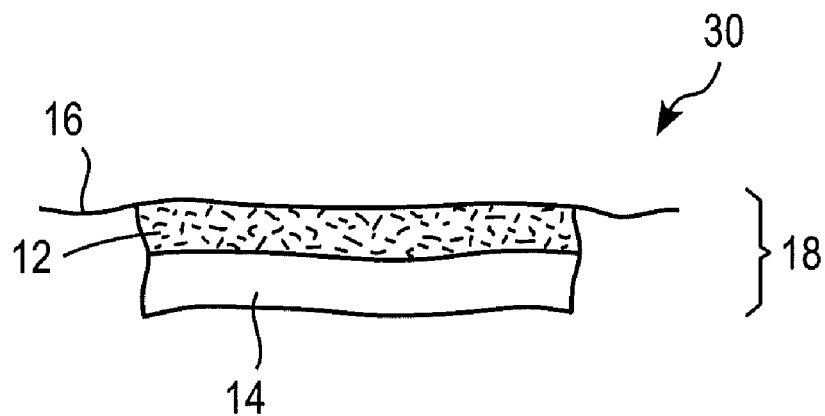

FIGS. 1A to 1C schematically illustrate several exemplary embodiments of a fluorine gas generating material composition. The illustrated embodiments of the fluorine gas generating material composition 10, 20, 30 include a fluorine bearing material 12, a coruscative material 14 and a separator 16. The coruscative material 14, the fluorine bearing material 12 and the separator 16 are arranged as a multilayer 18 having a first layer of the fluorine bearing material 12, a second layer of the coruscative material 14, and the separator 16 on at least one side of the coruscative layer 14.

The fluorine bearing material 12 includes a nickel-based alloy that stores fluorine at room temperature and releases fluorine gas at a first temperature at least about 350C. An example of a suitable nickel-based alloy is potassium hexafluoronickelate(IV). Other fluorine bearing materials, including those described and disclosed herein, can also be used in the fluorine gas generating material composition.

The coruscative material 14 includes an element from Group IVB, VB or VIB of the periodic table (or a transition metal) and a carbon-based material, a reaction temperature of the coruscative material equal to or greater than the first temperature. An example of a suitable coruscative material includes titanium and carbon. Other coruscative materials, including those described and disclosed herein, can also be used in the fluorine gas generating material composition.

The separator 16 can be formed of, for example, polymers, metals (e.g., foils), and metallized materials, such as metallized cellulose-based materials and metallized polymers. The separator is positioned adjacent to and in contact with at least part of the fluorine bearing material 12 and the coruscative material 14. In preferred embodiments, the separator is positioned between the first layer and the second layer, e.g., between the fluorine bearing material and the coruscative material, and contributes to regulating the rate of fluorine release from the fluorine bearing material by adjusting the rate of thermal heat transfer to the fluorine bearing material.

Figure 2:
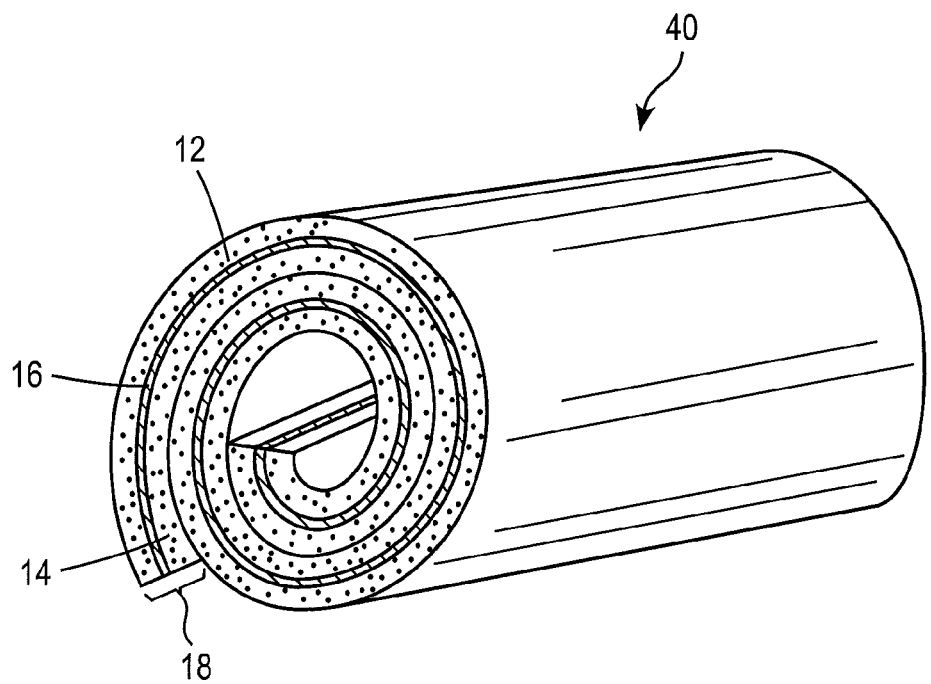
FIG. 2 illustrates a perspective view of an exemplary fluorine gas generating material composition with a multilayer including a coruscative material layer, a fluorine bearing material layer and a separator arranged in a coil.

FIG. 2 illustrates a perspective view of an exemplary fluorine gas generating material composition with a multilayer 18 including a layer of coruscative material 14, a layer of fluorine bearing material 12 and a separator 16 arranged in a coil 40. Here, the separator 16 is depicted between the layer of coruscative material 14 and the layer of fluorine bearing material 12. However, any of the arrangements of multilayers shown and described with respect to FIGS. 1A to 1C can be used in the coil 40. Further, the tightness of the coil, e.g., the number of layers in the radius, can be varied to attain different release rates of fluorine since the tightness of the coil is related to the packing density. Also, the separator can be used to regulate the rate of fluorine release from the fluorine bearing material by adjusting the rate of thermal heat transfer to the fluorine bearing material.

FIG. 3A illustrates an exemplary fluorine gas generating material composition 50 with a layer of coruscative material 14 and embedded particles 52 of a fluorine bearing material. The embedded particles 52 are shown in cross-section as embedded in a surface 54 of the layer of coruscative material 14, in which case, a plan view of a top surface would illustrate the particles 52 in the layer of coruscative material 14, like sand on sandpaper. Typical sizes for the particle 52 are on the order of less than one millimeter, preferably one to ten microns. The more fine the particle size, the larger the total surface area, e.g., the total surface area of all the particles 52 embedded in the layer of coruscative material 14 in a given area or volume of the composition 50, exposed to the layer of coruscative material 14 and the higher the release rate of fluorine. Although shown as embedded in the surface, other exemplary embodiments can include particles 52 in the volume of the layer of coruscative material 14.

FIG. 3B fluorine gas generating material composition illustrates an exemplary fluorine gas generating material composition in the form of a particle 60. Each particle comprises coruscative material 14 and fluorine bearing material 12. The particle 60 is on the order of less than one millimeter, preferably one to ten microns. However, a suitable size can be selected to achieve a desired packing density of the particles. The particle can be formed by forming a solid composition of coruscative material 14 and fluorine bearing material 12, e.g., by pressing and sintering or by alloying, and ball milling the solid composition to the desired particle size. Typically, the particle is ten parts fluorine bearing material to one part coruscative material, by volume, or any other suitable ratio, e.g., from about 2 to 1 to about 20 to 1. Exemplary embodiments of the particle 60 can be used in the embodiment shown and discussed with respect to FIG. 3A as well as other embodiments shown and described herein.

An exemplary embodiment of a product for producing fluorine gas comprises a fluorine bearing material, the fluorine bearing material releasing fluorine gas at a first temperature, a coruscative material, a reaction temperature of the coruscative material equal to or greater than the first temperature, and a container containing the fluorine bearing material and the coruscative material, the container having an opening to vent released fluorine gas, wherein the coruscative material is positioned within the container at least partially adjacent to the fluorine bearing material.

FIG. 4 is a cross-sectional view of an exemplary product for producing fluorine gas. In the simplified schematic shown, the product 70 includes a fluorine bearing material 72, a coruscative material 74, and a container 76. The container 76 contains the fluorine bearing material 72 and the coruscative material 74 and has an opening 78 to vent released fluorine gas from the fluorine bearing material 72 when the fluorine bearing material 72 is at or above a first temperature. The coruscative material 74 is positioned within the container 76 at least partially adjacent to the fluorine bearing material 72. The position of the coruscative material 74 with respect to the fluorine bearing material 72 is such that the heat generated by a reaction of the coruscative material 74 is sufficient to raise a temperature of the fluorine bearing material 72 to or above the first temperature e.g., that temperature at which the fluorine bearing material 72 releases the absorbed fluorine gas. For some nickel-based alloys, this first temperature is at least 350° C. An optional igniter 80 is also illustrated with an initiating device 82, such as a fuse. Suitable igniters include electrical ignition sources, impact ignition sources and other munition igniters.

Multiple openings may be present in the container. Each opening can vent released fluorine gas that can be used to, for example, impulse the container or an object including the container, erode a material placed in contact with the venting gas, and so forth. Openings that are not used for venting the released fluorine gas can optionally be capped, by for example, a threaded cap 84.

In some exemplary embodiments, the fluorine gas generating material composition can be incorporated into a product such as a munition, a flare, a shape charge or an impulse device, e.g., a device that releases matter (gas, solid, or liquid) to impart momentum and change direction of an object such as a missile or a satellite.

The disclosed fluorine gas generating material composition and product for producing fluorine gas can be used to produce work. Several applications and methods are contemplated within the present disclosure. These include point delivery of fluorine gas, explosives related applications, aerospace applications, and applications in the fields of mining and drilling.

An exemplary embodiment of a method of delivering a fluorine gas to a delivery point comprises storing fluorine gas in a product for producing fluorine gas and transporting the product for producing fluorine gas from a storing location to the delivery point. The product includes a fluorine bearing material releasing the stored fluorine gas at a first temperature, a coruscative material having a reaction temperature of the coruscative material equal to or greater than the first temperature and a container containing the fluorine bearing material and the coruscative material, the container having an opening to vent released fluorine gas, wherein the coruscative material is positioned within the container at least partially adjacent to the fluorine bearing material.

An exemplary embodiment of a method of clearing debris from a downhole comprises placing a charge in a region of the downhole, the charge including a fluorine gas generating material composition having a fluorine bearing material and a coruscative material, releasing fluorine gas by initiating a reaction of the coruscative material to heat the fluorine bearing material, and clearing the debris by expansion or flow of the released fluorine.

One exemplary embodiment of such a method is shown in FIG. 5. A charge 100 including a fluorine gas generating material composition having a fluorine bearing material and a coruscative material is placed within a downhole 102 of a well. The charge 100 may be associated with another downhole device 104, such as a drilling apparatus or a pumping apparatus, or the charge 100 may be associated with a dedicated clearing apparatus, e.g., on its own piping and control system. At a given depth d in the downhole 102, the charge 100 is initiated to release fluorine gas. While some effect of perforating the walls 106 of the downhole 102 may be achieved by initiating a reaction of the coruscative material to generate heat and a solid reaction product, the major effect of perforating the walls 106 of the downhole 102 is a result of the fluorine gas 108 released at a high velocity in a given direction. As shown in FIG. 5, the direction of release 110 can be into the soil and rock material of the downhole 102. Optionally, the downhole debris 112 is also reduced in size by the charge 100 to a size suitable for breaking the soil and rock material into debris size by entraining the debris 112 in the flowing fluorine gas. The debris then impacts the solid material of the downhole wall and further perforates the wall and/or reduces the size of the debris 112 further. Also, the smaller debris size facilitates removal of the debris 112 from the downhole 102 by the venting of the released fluorine, which ultimately is vented from the downhole 102 either ambiently or by a venting hole or pipe. The venting path may be included in the downhole device, such as a drilling apparatus or a pumping apparatus, or in the dedicated clearing apparatus.

In another exemplary embodiment, a method to perforate an object is provided. This exemplary method comprises positioning a product for producing fluorine gas in a vicinity of the object, detonating a high explosive material to fracture the container into a plurality of particles, initiating a reaction of the coruscative material to generate heat and a solid reaction product, releasing stored fluorine from the fluorine bearing material, and expanding the released fluorine to drive the plurality of particles toward the object. The product includes a fluorine bearing material, the fluorine bearing material releasing the stored fluorine gas at a first temperature, a coruscative material, a reaction temperature of the coruscative material equal to or greater than the first temperature, and a container containing the fluorine bearing material and the coruscative material, wherein the coruscative material is positioned within the container at least partially adjacent to the fluorine bearing material.

An exemplary embodiment of a method of providing impulse to an object comprises incorporating a fluorine gas generating material composition into the object, the fluorine gas generating material composition including a fluorine bearing material releasing fluorine gas at a first temperature, and a coruscative material having a reaction temperature equal to or greater than the first temperature, and impulsing the object by initiating a reaction of the coruscative material of the fluorine gas generating material composition to release fluorine gas to a propellant fuel. For example, the released fluorine gas can be directed to a combustion chamber of a rocket motor where it combines with a fuel, e.g., a light element fuel such as a boronated propellant, to produce an impulse. In another example, specific impulse can be provided to a kinetic energy penetrator to increase, or "boost" a velocity of the kinetic energy penetrator either before or after contact with a target.

One exemplary embodiment of a kinetic energy penetrator that incorporates the method of providing impulse is shown in FIG. 6. In the FIG. 6 exemplary embodiment, a longitudinal cross-sectional view of a kinetic energy penetrator 150 is shown. An example of a kinetic energy penetrator is a BLU-109 warhead or other munition such as BLU-109/B, BLU-113, BLU-116, JASSM-1000, J-1000, and the JAST-1000. The warhead casing 152 contains an unspecified main payload operating after target penetration within a payload area 154. A fluorine gas generating material composition 156 is incorporated into the kinetic energy penetrator 150, for example at an aft end 158. The fluorine gas generating material composition 156 can be substantially similar to the product for producing fluorine gas shown and described herein with respect to FIG. 4. In the kinetic energy penetrator 150 of FIG. 8, the reaction of the coruscative material 160 is initiated by an igniter 162, which can optionally be incorporated into the fusing of the kinetic energy penetrator 150 to initiate the coruscative reaction upon the fusing event, e.g., nose cone contact, deceleration, pressure, time and so forth, and cause the fluorine to be released from the fluorine bearing material 164. The released fluorine gas is vented through opening 166 in a pressure bulkhead 168, e.g., a forward cap of a motor casing, and into a combustion region 170. Although illustrated as in an aft end 158 directly abutting the pressure bulkhead 168, the fluorine gas generating material composition 156 can be at any suitable location within the penetrator 150 and the released fluorine gas can be directed toward the combustion region by suitable conduits. In the combustion region 170, the released fluorine gas reacts with a fuel 172, such as a solid rocket propellant or other fuel such as a light element fuel, e.g., a boronated propellant. The products of this reaction are vented aftward through opening 174 and provide an impulse to the kinetic energy penetrator 150. The opening 174 can be a single opening or a plurality of openings. Further, the opening 174 can be a valved opening that can be controlled to steer the kinetic energy penetrator 150, similar to a jet reaction control system. See, for example, U.S. Pat. No. 6,460,801 for disclosure concerning a jet reaction control system.

An exemplary embodiment of a method of perforating armor comprises incorporating a fluorine gas generating material composition into a penetrator, the fluorine gas generating material composition, including a fluorine bearing material, the fluorine bearing material releasing fluorine gas at a first temperature and a coruscative material, a reaction temperature of the coruscative material equal to or greater than the first temperature, directing the penetrator toward the armor, initiating a reaction of the coruscative material of the fluorine gas generating material composition to release fluorine gas, and directing the released fluorine gas toward the armor to perforate or erode the armor. Here, the fluorine gas is vented from openings near a nose cap of the penetrator such that the fluorine gas impacts the armor, such as ceramic or reactive armor. The velocity of the fluorine gas and/or a reaction with the fluorine gas causes the armor to be perforated and/or eroded and/or abraded.

One exemplary embodiment of a penetrator that incorporates the method of perforating armor is shown in FIG. 7. In the FIG. 7 exemplary embodiment, a longitudinal cross-sectional view of a penetrator 180 is shown. An example of a is a BLU-109 warhead or other munition such as BLU-109/B, BLU-113, BLU-116, JASSM-1000, J-1000, and the JAST-1000. The warhead casing 182 contains an unspecified main payload operating after target penetration within a payload area 184. A fluorine gas generating material composition 186 is incorporated into the penetrator 180, for example, at a forward end 188. The fluorine gas generating material composition 186 may or may not be conformal to an inner surface of the warhead casing 182. The fluorine gas generating material composition 186 can be substantially similar to the product for producing fluorine gas shown and described herein with respect to FIG. 4. In the penetrator 180 of FIG. 7, the reaction of the coruscative material 190 is initiated by an igniter 192, which can optionally be incorporated into the fusing of the kinetic energy penetrator 180 to initiate the coruscative reaction upon the fusing event, e.g., nose cone contact, deceleration, pressure, time and so forth, and cause the fluorine to be released from the fluorine bearing material 194. The released fluorine gas is vented through opening 196 in the nose cap region 138 of the penetrator 180. For example, the opening 196 can be set back from a distal end 198 of the nose cap 200 to vent fluorine gas to a contacted object, e.g., armor of a vehicle. Here, the opening 196 is shown as a two openings in warhead casing 182. However, any type opening or plurality of openings can be used, including valved openings and openings incorporated into the nose cap. The vented fluorine gas contributes to perforate and/or erode and/or abrade the material in the contacted object by either reaction of the vented fluorine gas with the material of the contacted object and/or by erosion and/or abrasion of the material of the contacted object by the high velocity vented fluorine gas. Further, although illustrated as in a forward end 188, the fluorine gas generating material composition 186 can be at any suitable location within the penetrator 180 and the released fluorine gas can be directed toward the opening 196 by suitable conduits.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A composition comprising:
    a fluorine bearing material, the fluorine bearing material releasing fluorine gas at a first temperature; and
    a coruscative material comprising Ti and C, a reaction temperature of the coruscative material equal to or greater than the first temperature.
2. The composition of claim 1, wherein the fluorine bearing material is a ceramic or a metal that stores fluorine.
3. The composition of claim 2, wherein the metal is a nickel-based material.
4. The composition of claim 3, wherein the nickel-based material is potassium hexafluoronickelate(IV).
5. The composition of claim 1, wherein the first temperature is at least about 350° C.
6. The composition of claim 1, wherein the reaction temperature is at least 2500° C.
7. The composition of claim 1, wherein the coruscative material is non-outgassing.
8. The composition according to claim 1, wherein the fluorine bearing material comprises a solid matrix with fluorine gas contained therein.
9. The composition of claim 1, wherein the coruscative material is substantially non-outgassing.

* * * * *

UNITED STATES PATENT AND TRADEMARK OFFICE
CERTIFICATE OF CORRECTION

PATENT NO. : 7,638,006 B2
APPLICATION NO. : 10/922866
DATED : December 29, 2009
INVENTOR(S) : James R. Wood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Ninth Day of November, 2010

David J. Kappos
*Director of the United States Patent and Trademark Office*